W. J. ELSE.
DISPENSING APPARATUS.
APPLICATION FILED AUG. 8, 1921.
1,414,777.  Patented May 2, 1922.
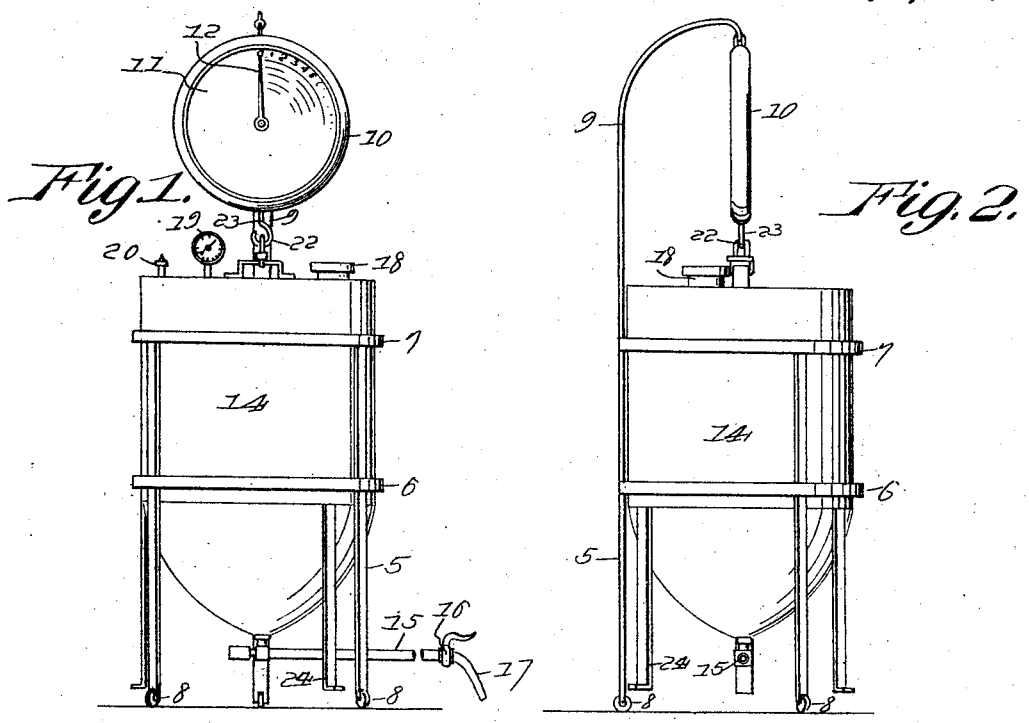
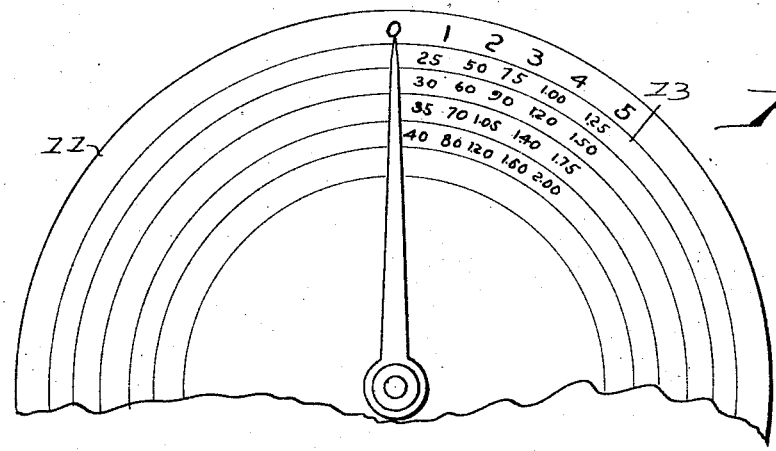
Inventor,
Walter J. Else,
By
Attorney.

UNITED STATES PATENT OFFICE.

WALTER J. ELSE, OF GRAND ISLAND, NEBRASKA.

DISPENSING APPARATUS.

1,414,777.  Specification of Letters Patent.  Patented May 2, 1922.

Application filed August 8, 1921. Serial No. 490,558.

*To all whom it may concern:*

Be it known that I, WALTER J. ELSE, a citizen of the United States of America, and resident of Grand Island, in the county of Hall and State of Nebraska, have invented certain new and useful Improvements in Dispensing Apparatus, of which the following is a specification.

This invention relates to dispensing apparatus and particularly to a device for dispensing oils and greases to customers, although, of course, it is capable of other uses.

Primarily, however, it is an object of this invention to provide an apparatus for use of stores that handle automobile accessories or are dispensing oils and greases which are very often delivered directly to parts of the automobile, such as the crank case, gear casings or to the fuel tank; and it is the purpose of this invention to produce novel means whereby the quantity of material delivered to a customer can be determined by reading scales denoting the amount of fluid dispensed, the same being indicated by a reduced weight of the receptacle and its contents, which weight will, of course, be reduced proportionally to the amount of the commodity taken from the container.

It is a further object of this invention to provide a price scale, associated with the means for supporting the receptacle in order that the scale will indicate the amount of material being taken from the receptacle, and register the price and cost thereof.

A still further object of this invention is to produce a dispensing apparatus of the character indicated which will be portable in order that the merchant can move the same to convenient position for delivery of the commodity to the purchaser.

With the foregoing and other objects in view, the invention consists in the details of construction, and in the arrangement and combination of parts to be hereinafter more fully set forth and claimed.

In describing the invention in detail, reference will be had to the accompanying drawings forming part of this application wherein like characters denote corresponding parts in the several views, and in which—

Figure 1 illustrates a view in elevation of an apparatus embodying the invention;

Figure 2 illustrates a similar view taken at right angles to that of Fig. 1;

Figure 3 illustrates an enlarged detail view of a scale dial.

In these drawings I have shown a stand or frame comprising three or more legs 5 connected by rings or bands 6 and 7 which act to support the scales and the load. The legs have anti-friction rollers 8 of any approved type, which will permit the stand or frame to be expeditiously moved from place to place for convenience in serving customers. One of the legs 5 has an extension 9, which is in the nature of a bracket, for suspending the scales 10. The scales may be of different types, but I prefer to use what is known as a price scale in which the dial 11 is rotated with respect to the pointer or indicator 12, and as shown in Fig. 3, the dial may have a series of concentric circles 13 forming spaces containing indicia. The outer or marginal circle preferably contains characters from 0 to such number as convenience of use may dictate. These will indicate the pounds of material which have been dispensed. The other concentric circles may enclose spaces which denote the price and cost of the commodity. For instance, those numbers which are arranged radially with respect to the number 1 would indicate the price of one pound of the commodity, while those numbers arranged radially with respect to the other marginal numbers would denote the cost of the number of pounds indicated in the margin, and so the merchant and the purchaser would be able to determine from the reading of the dial, the number of pounds delivered and the cost thereof.

The receptacle 14 is preferably air-tight and it may have a dispensing pipe 15 the flow through which is controlled by a valve 16 and suitable hose or pipings 17, here but conventionally shown, may form a continuation of the means for dispensing the commodity.

The receptacle 14 in this embodiment of the invention is preferably air-tight, as stated, and has a filling opening 18 through which the commodity may be introduced into the receptacle; and it furthermore has a gage 19 by which the pressure within the receptacle may be determined. An air supplying nipple 20 also communicates with the interior of the receptacle, and this nipple may be controlled to permit air to enter the receptacle, but will prevent the escape of the air, it being the purpose of the inventor that air shall be forced into the receptacle for the purpose of displacing heavier greases such as will not readily flow by gravity, in order that such heavier greases will be forced through the dispensing pipe when the valve is opened. Of course when the device is used in connection with oils or other fluids, gravity may be relied upon for discharging the fluids, although if the fluid is to be delivered to crank cases and the like which are above the level of the fluid within the receptacle, it would be still necessary to use the compression afforded by the air which is forced into the receptacle.

The receptacle is supplied with a handle 21 and a hook 22, the latter of which is suspended from a hook 23 of the scales. The handle 21 is intended to be grasped by an operator for lifting the receptacle from the scales, in order that the weight of the receptacle may be removed from the scales when not in use, and provision is made for supporting the receptacle on legs 24 which are of such length as to clear the floor or support on which the legs 5 are resting when the said receptacle is suspended from the scales.

In this device, the weight of the receptacle and its contents decreases as the contents are dispensed, and hence when the receptacle is heaviest, it need be lifted only slightly.

I claim:

In a commodity dispensing apparatus, a frame comprising upright elements and bands in spaced relation to each other attached to the upright elements, anti-friction members on the lower ends of the upright elements to permit the frame to be moved and a receptacle movable vertically in the frame, means for suspending the receptacle including a weighing device and legs on the receptacle adapted to support the said receptacle free of the frame when released from the weighing device, means for supplying air to the interior of the receptacle, and means for discharging the contents of the receptacle.

WALTER J. ELSE.

Witnesses:
B. J. CUNNINGHAM,
GERTRUDE C. WADDICK.